United States Patent [19]

Rising

[11] 4,159,174
[45] Jun. 26, 1979

[54] METHOD AND APPARATUS FOR ADJUSTING THE CORRECTION LEVELS IN A SETTABLE MATRIX PRINTER

[75] Inventor: Bradley D. Rising, Rochester, N.Y.

[73] Assignee: Eastman Kodak Company, Rochester, N.Y.

[21] Appl. No.: 802,084

[22] Filed: May 31, 1977

[51] Int. Cl.$^2$ .............................................. G03B 27/78
[52] U.S. Cl. ....................................... 355/38; 355/77; 355/88
[58] Field of Search ................................... 355/35–38, 355/77, 88; 356/175; 250/226; 358/80

[56] References Cited

U.S. PATENT DOCUMENTS

| 3,120,782 | 2/1964 | Goddard et al. | 355/38 |
| 3,502,410 | 3/1970 | King et al. | 355/38 |
| 3,588,827 | 6/1971 | Van Roessel | 340/166 |

OTHER PUBLICATIONS

SPSE Handbook of Photographic Science and Engineering, Wiley and Sons, 1973, pp. 461–468.
Journal of the Society of Motion Picture and Television Engineers, vol. 65, pp. 205–215, 1956.

Primary Examiner—L. T. Hix
Assistant Examiner—W. J. Brady
Attorney, Agent, or Firm—N. Rushefsky

[57] ABSTRACT

In a settable matrix photographic color printer, Neutral, Green-chromaticity, and Illuminant-chromaticity correction levels and associated color rotations are adjusted by: transforming the printer correction matrix from a Red, Green, Blue coordinate system to a Neutral, Green-chromaticity, Illuminant-chromaticity coordinate system whereby the diagonal elements of the transformed matrix represent the Neutral, Green-chromaticity, and Illuminant-chromaticity correction levels, and the off-diagonal elements of the matrix represent color rotations; changing the value of the elements of the transformed matrix as desired; and transforming the thus adjusted matrix back into the Red, Green, Blue color coordinate system.

16 Claims, 11 Drawing Figures

METHOD AND APPARATUS FOR ADJUSTING THE CORRECTION LEVELS IN A SETTABLE MATRIX PRINTER

CROSS REFERENCE TO RELATED APPLICATIONS

Reference is made to commonly assigned, copending U.S. patent application Ser. No. 802,085, entitled EXPOSURE DETERMINATION APPARATUS FOR A PHOTOGRAPHIC PRINTER filed in the names of B. Rising and W. Severin on even date herewith.

BACKGROUND OF THE INVENTION

1. Field of the Invention

The present invention relates to automatic color photographic printers having settable matrix exposure control computers. More specifically, the invention relates to a method and apparatus for adjusting the settable matrix in such printers.

2. Description of the Prior Art

U.S. Pat. No. 3,120,782 issued Feb. 11, 1964 to Goddard and Huboi discloses an exposure determination system for a color photographic printer that is based on a linear combination of red, green, and blue large area transmission densities (LATD's). For an explanation of LATD and a general introduction to the discussion that follows, see the SPSE Handbook of Photographic Science and Engineering, Wiley and Sons 1973, pages 461–468. In such a printer, the red exposure, for example, is computed as a function of all three (i.e. red, green, and blue) LATD's rather than being based on a measurement of the red LATD alone.

If the characteristics of the printing filters are similar to the responses of the color channels of the densitometer portion of such a printer, the printing densities relate linearly to the measurements made by the densitometer portion of the printer and can be expressed in matrix form as follows:

$$[D] = [P][C]([LATD] - [\overline{LATD}]) \qquad (1)$$

where:
- $[D]$—is a 3×1 column vector having elements $d_I$ representing Printing Densities in a Red, Green, Blue coordinate system;
- $[P]$—is a 3×3 matrix of elements $p_{ij}$ relating Integral Densities to Printing Densities;
- $[C]$—is a 3×3 diagonal matrix of elements $c_{ij}$ relating Densitometer Voltages to Integral Densities;
- $[LATD]$—is a 3×1 column vector having elements $LATD_i$ representing the Densitometer Voltages generated by the Red, Green, and Blue color channels of the densitometer portion of the printer; and
- $[\overline{LATD}]$—is a 3×1 column vector having elements $\overline{LATD}_i$ representing the Densitometer Voltages of the calibration original, the calibration original representing some standard such as the center of the population of originals to be printed.

The exposure equations for such a printer take the following form:

$$[\log E] = [K] + [A][D] \qquad (2)$$

where:
- $[\log E]$—is a 3×1 column vector having elements $\log E_i$ representing the Log Source Exposures of the exposure portion of the printer, i.e., the exposures impinging upon the original, expressed in a Red, Green, Blue coordinate system;
- $[K]$—is a 3×1 column vector having elements $k_i$ representing the average Log Exposures or aim points for the population of originals being printed;
- $[D]$—is a 3×1 column vector having elements $d_i$ representing the Printing Densities calculated in equation (1); and
- $[A]$—is a 3×3 matrix of elements $a_{ij}$ relating the Log Exposures to the Printing Densities.

$$[A] = \begin{bmatrix} a_{11} & a_{12} & a_{13} \\ a_{21} & a_{22} & a_{23} \\ a_{31} & a_{32} & a_{33} \end{bmatrix}$$

The matrix $[A]$ is called the correction matrix of the printer and will generally have off-diagonal elements. Matrix $[A]$ is physically embodied in the printer described in U.S. Pat. No. 3,120,782 as a matrix of operational amplifiers and variable resistors. The elements $a_{ij}$ of the correction matrix are adjustable by changing the values or responses of the electronic components comprising the matrix. For this reason, such a printer is called a settable matrix printer. In another type of settable matrix printer, the matrix is stored in digital form in the memory of a digital computer associated with the printer. The exposure control equations are solved by the digital computer, and the results are used to control the exposure portion of the printer. An example of such a printer is the Eastman Kodak Company 2610 Color Printer.

In a settable matrix printer, the correction matrix $[A]$ is said to be a zero correction matrix if measured differences in LATD's, from original to original, result in corresponding changes of comparable magnitude in the resulting prints. Thus if matrix $[A]$ is a zero correction matrix, the log exposures will be equal to the aim points $k_i$ of the exposure equations (2), and the correction matrix $[A]$ will approach a null matrix, i.e., all elements approach zero.

A full correction matrix is defined as one that results in all originals being printed so that there is no variation in the average overall densities in the resulting prints. In such a case, the correction matrix $[A]$ would approach a unit diagonal matrix, i.e., elements $a_{11}$, $a_{22}$, and $a_{33}$ would approach unity, and all other elements would approach zero.

Full correction is desirable to compensate for unwanted variations in LATD's caused by such things as film keeping, incorrect exposure, and improper match between illuminant and film balance (e.g., exposing daylight film under tungsten lighting conditions). However, for those cases where the variations in LATD are due solely to the content of the original scene (commonly called subject failure scenes because they disobey the basic assumption that all scenes integrate to a shade near grey), a zero correction matrix is desirable. The zero correction matrix is needed so that unwanted color shifts in the resulting print will not be introduced by the corrective action of the printer.

One approach to resolving these conflicting requirements for zero and full correction has been to adjust the values of matrix elements $a_{ij}$ in correction matrix $[A]$ so that the printer will operate at some compromise correction between full and zero. For a discussion of optimum correction for photographic printers in general, see the Article published by Bartelson and Huboi in the Journal of the Society of Motion Picture and Television Engineers, Vol. 65, pages 205-215, 1956. As is pointed out in the Bartelson and Huboi article, the optimum correction level is a function of the population of negatives being printed and varies for different negative populations.

In order to explain the prior art methods for adjusting the matrix elements in the printer correction matrix [A], it would first be helpful to expand upon the concept of printer correction that has been discussed above.

In general, "correction level" may be defined as the rate of change of a given component of source exposure with respect to some related change in a component of the density of the original. If the exposure equation (2) is rewritten to represent changes, it appears as follows:

$$[\Delta \log E] = [A] [\Delta D] \qquad (3)$$

It is seen that in the general sense, the matrix elements $a_{ij}$ are correction levels since they relate changes in components of log source exposure ($\Delta \log E_i$) to some changes in components of the measured density of the original ($\Delta D_j$). For example, element $a_{11}$ relates the change in red log exposure to a change in red density; $a_{21}$ relates the change in green log exposure to a change in red density, etc. The relationships or correction levels defined by the elements of matrix [A], however, do not coincide with any intuitive concept of correcting the exposure of a print.

The traditional subjective criteria for evaluating color prints have been neutral density (i.e., is the overall print too light or too dark), color balance or hue (i.e., do the colors in the print appear as the scene is remembered) and saturation or pureness of the color (i.e., are the colors bright and pure, or are they grey and muddy).

Figure 1:
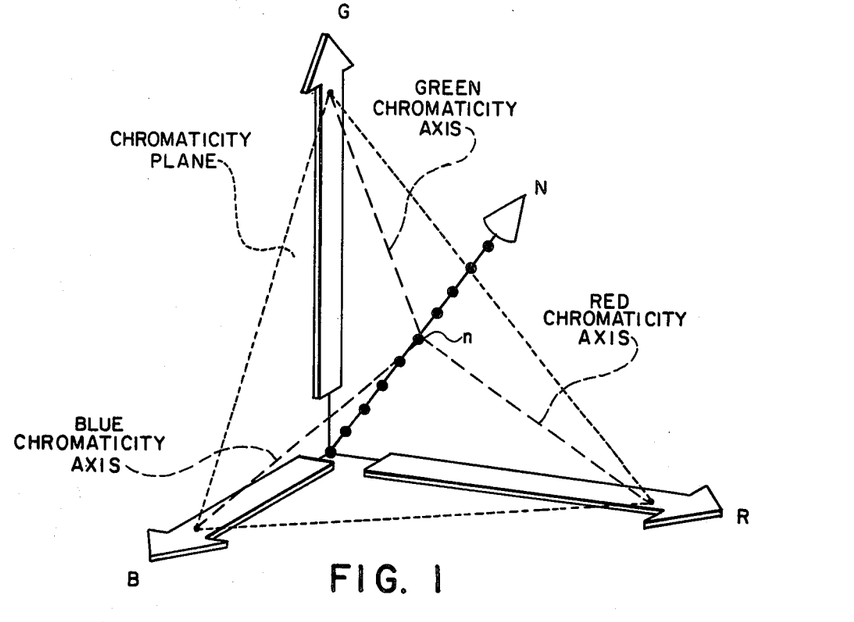
FIG. 1 is a diagram showing the relationship between an orthogonal 3 dimensional coordinate system having axes labeled R, G, B and another coordinate system defined by a Neutral axis N and a chromaticity plane.

The primary additive colors can be thought of in terms of an orthogonal 3 dimensional coordinate system with axes labeled R, G, and B (see FIG. 1). The traditional subjective criteria for judging color prints may be described in a new coordinate system defined in the following way. A Neutral axis N is defined as R=G=B. At any given point on the Neutral axis N, a plane perpendicular to the axis N is called a chromaticity plane and the projection of the R, G, B axes onto the chromaticity plane are called the Red, Green, and Blue chromaticity axes. The radial distance from the point n on the chromaticity plane represents saturation and the location in the chromaticity plane relative to the chromaticity axes represents hue. This new coordinate system is shown relative to the R, G, B coordinate system in FIG. 1.

Traditionally, correction levels have been discussed in terms of changes along the Neutral axis N and changes along axes in a chromaticity plane.

Strictly speaking, there is only one Overall Neutral Correction Level and it represents the rate of change in the neutral components of the combined R, G, B Log Source Exposures with respect to a given change in the neutral density of an original. The Overall Neutral Correction Level is defined as:

$$ONC = \frac{\Delta \log E_N}{\Delta D_N} \qquad (4)$$

where: ONC is the Overall Neutral Correction Level $\Delta \log E_N = \frac{1}{3}(\Delta \log E_R + \Delta \log E_G + \Delta \log E_B)$ and
$\Delta D_N = \frac{1}{3}(\Delta D_R + \Delta D_G + \Delta D_B)$ However, the Overall Neutral Correction Level is commonly broken down into its Red, Green, and Blue components which are traditionally referred to as slopes and are expressed as:

$$NC_i = \frac{\Delta \log E_i}{\Delta D_N} \qquad (5)$$

where i takes on the values R, G, or B.

Any printer may be considered to have a unique chromaticity correction level for any arbitrary axis in a chromaticity plane. However, the most commonly considered chromaticity correction levels have been those occurring along the Red, Green, and Blue chromaticity axes and are defined as:

$$CC_i = \frac{\Delta \log E_{ci}}{\Delta D_{ci}} \qquad (6)$$

where: i takes on the values R, G, and B and
log $E_{ci}$ and $D_{ci}$ are changes in log exposure and density along the respective R, G, and B chromaticity axes.

Figure 2:
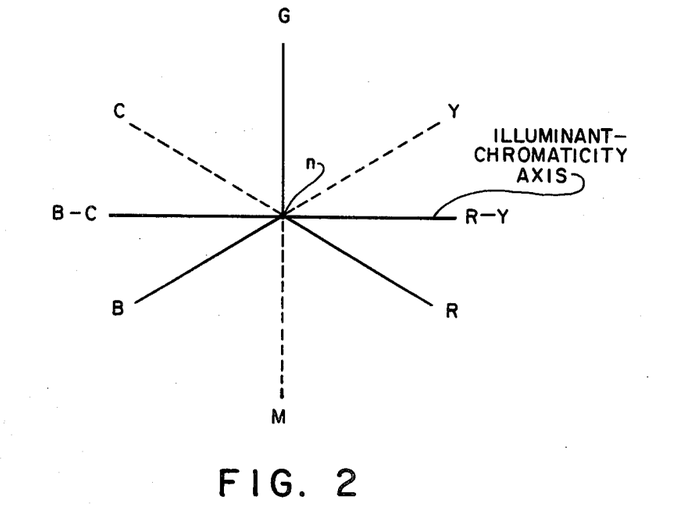
FIG. 2 is a diagram of a chromaticity plane showing the Red, Green, and Blue chromaticity axes and an Illuminant-chromaticity axis.

In addition, changes along an axis that lies substantially midway between the minus Red (or Cyan) and Blue chromaticity axes in the chromaticity plane have been considered. This chromaticity axes will be called the Illuminant-chromaticity axis since it is generally along this axis that color shifts occur when scene illumination is changed from tungsten to daylight. Since these color shifts are less frequently representative of scene content, it is usually desirable to have a higher correction level along the Illuminant-chromaticity axis. FIG. 2 represents a chromaticity plane showing the relationship of the Red, Green, and Blue chromaticity axes to the Illuminant-chromaticity axis. Extensions of the R, G, and B axes are labeled C, M, and Y respectively to represent the subtractive primary colors cyan, magenta, and yellow.

The chromatic correction levels along the Illuminant-chromaticity axis can be calculated from the correction matrix [A] of a settable matrix printer, but are usually determined empirically by printing a test patch or set of patches that vary from an average along the Illuminant-chromaticity axis. The patches are printed in a "locked beam" (i.e., correction matrix disabled) and in a "normal" (correction matrix in effect) mode and the resulting prints compared by densitometry to see how much correction has taken place.

Since most amateur photographic cameras operate with a fixed aperture and shutter speed i.e., they do not incude automatic exposure control, a large percentage of the pictures taken with such cameras are either under or over exposed. Thus, in any given population of originals taken by amateur photographers, by far the largest number of unwanted variations in the originals occur along the Neutral axis. For this reason, a relatively high Overall Neutral Correction Level is generally desirable. The next most frequent unwanted variation in originals taken by amateur photographers occurs along the Illumiant-chromaticity axis and is due to the fact that when film that is balanced for daylight exposure is exposed indoors under tungsten illumination, the colors in the original will be shifted along the illuminant axis with the resulting print appearing too warm. The reverse of this problem occurs when film balanced for tungsten illumination is exposed in daylight. Thus, a relatively high Illuminant-chromaticity correction level is generally desirable.

The Green-chromaticity axis is mutually perpendicular to both the neutral axis and the Illuminant-chromaticity axis. Since green-grass subject failure is a common occurrence in negative populations, it is often desirable to adjust the correction level along the Green-chromaticity axis. For the reasons noted above, it is often desirable to adjust the Neutral, Illuminant-chromaticity, and Green-chromaticity correction levels in settable matrix printers.

According to prior art methods, the Red, Green, and Blue-Neutral and Red, Green, and Blue-Chromaticity correction levels have been computed from the elements of the correction matrix [A] in the following manner:

$$NC_i = \sum_{j=1}^{3} a_{ij} \quad (7)$$

$$ONC = \tfrac{1}{3} \sum_{i=1}^{3} \sum_{j=1}^{3} a_{ij} \quad (8)$$

where $NC_i$ are the Red, Green, and Blue Neutral Correction Levels, ONC is the Overall Neutral Correction Level and $a_{ij}$ are elements of correction matrix [A].

and $$CC_i = \tfrac{2}{3}a_{ii} - \tfrac{1}{3}(a_{ij} + a_{ik} + a_{ji} + a_{ki}) + 1/6 \\ (a_{jj} + a_{kk} + a_{jk} + a_{kj}) \quad (9)$$

where:

$a_{ij}$ are the correction matrix elements, $i \neq j \neq k$ and $CC_i$ are the Red, Green, and Blue Chromaticity Correction Levels.

When it was desired to modify the correction matrix [A] to change correction levels, a change matrix [Q] was constructed according to some empirically derived rules outlined below. The old correction matrix [A] was multiplied on the right by the change matrix [Q] to yield the new correction matrix.

$$[A]_{new} = [A]_{old} [Q] \quad (10)$$

where [Q] is a 3×3 matrix of elements $$q_{ij} = \begin{bmatrix} q_{11} & q_{12} & q_{13} \\ q_{21} & q_{22} & q_{23} \\ q_{31} & q_{32} & q_{33} \end{bmatrix}$$

For independent adjustment to all Red, Green, and Blue correction levels, the following rules were applied to generate the elements $q_{ij}$ of the change matrix [Q]:

$$\text{diagonal elements } q_{ii} = 0.222(5X_i - X_j - X_k - 1.5Y_i) \quad (11)$$

$$\text{off-diagonal elements } q_{ij} = q_{ik} = \frac{Y_i - q_{ii}}{2} \quad (12)$$

where:

$Z_i$—is the ratio of the new chromaticity correction level to the old chromaticity correction level $$X_i = \frac{CC_{i\,new}}{CC_{i\,old}}$$

$Y_i$—is the ratio of the new neutral correction level to the old neutral correction level $$Y_i = \frac{NC_{i\,new}}{NC_{i\,old}}$$

and $i \neq j \neq k$, each taking on the value of R, G, or B. Some control over the Illuminant-chromaticity correction level was exercised by relating the Illuminant-chromaticity correction level to the Red, Green, and Blue chromaticity correction levels by the formula:

$$CC_I = \tfrac{1}{4}(CC_R + CC_B) - \tfrac{1}{2}CC_G.$$

where $CC_I$ is the Illuminant-chromaticity correction level.

From the above, it can be seen that, at most, 6 parameters (the 3 neutral correction levels $NC_i$ and 3 chromaticity correction levels $CC_i$) were used to define changes to all nine elements of the correction matrix [A].

There was an inherent limitation in the prior art method of modifying the correction matrix [A] since the combination of 6 correction levels does not uniquely define a correction matrix [A]. Different correction matrices having different relationships between the off-diagonal elements ($a_{ij}$, $i \neq j$) may produce identical values for the six correction levels defined above. These differences in the off-diagonal elements of different correction matrices having identical correction levels result in hue shifts in the resulting prints. These hue shifts have been intuitively discussed in the prior art in terms of color "rotations". However, in the prior art methods known to the inventor, there has not been a means for precisely quantifying and exactly controlling these color rotations when changing correction levels in settable matrix printers.

SUMMARY OF THE INVENTION

It is therefore an object of the present invention to provide a method and apparatus for adjusting the correction levels of a settable matrix printer than uniquely defines a new correction matrix.

It is a further object to provide such method and apparatus that enables the operator to control the color rotations induced by implementing changes in correction levels.

It is a still further object to provide a method and apparatus for adjusting correction levels that is relatively simple to operate.

These and other objects are accomplished according to the invention by providing a method and apparatus for: transforming the correction matrix [A] from a first coordinate system having axes that generally correspond to the measured parameters of the original to a second coordinate system having axes that generally correspond to the correction levels that are to be adjusted; modifying the value of the matrix elements of the transformed correction matrix; and performing the inverse transformation to return the modified correction matrix to the first coordinate system.

In a further embodiment, the correction matrix resides in the printer in the transformed state. The readings from the densitometer portion of the printer are first transformed to the second coordinate system, the densities in the second coordinate system are multiplied by the correction matrix to yield log exposures in the second coordinate system, and the log exposures are transformed back into the first coordinate system for printing. In this way, changes are made directly to the elements of the correction matrix.

DESCRIPTION OF THE PREFERRED EMBODIMENT

As pointed out above, the elements $a_{ij}$ of correction matrix [A] do not directly represent any traditionally defined or easily visualized correction levels. Therefore, any changes in the correction levels of a settable matrix printer must be effected through a procedure that relates the desired changes in correction levels to the values of the elements of the correction matrix. The methods and apparatus of the prior art do not yield a unique correction matrix since certain effects called "rotations" are not being handled in a quantitative manner. In the course of the search for a solution to this problem, the inventor noted that since a plane can be completely described in terms of any two orthogonal axes, the chromaticity plane with its Red, Green, and Blue chromaticity axes is overdefined. If one chooses any two orthogonal axes in the chromaticity plane such as the Illuminant-chromaticity axis and the Green-chromaticity axis, the chromaticity plane will be completely defined. If the Neutral axis is chosen as a third axis, a new orthogonal coordinate system is defined in which any point in the R, G, B coordinate system may be expressed.

Figure 3:
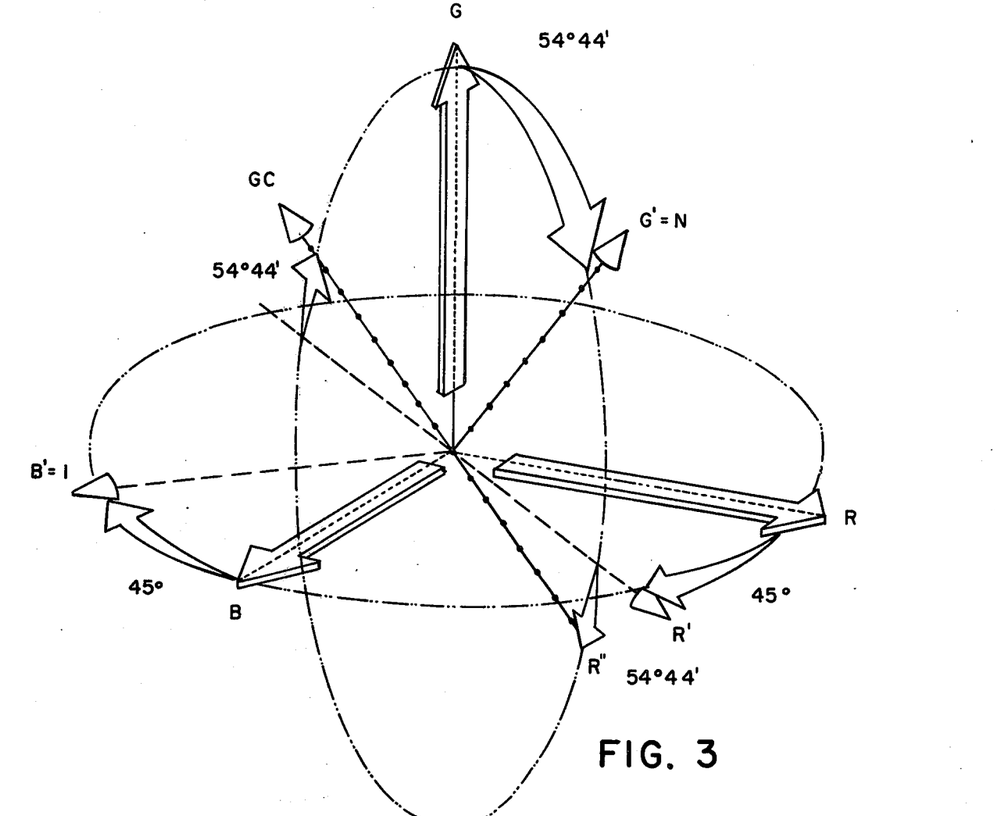
FIG. 3 is a diagram showing how the Red, Green, Blue coordinate system may be transformed into a Neutral, Green-chromaticity, Illuminant-chromaticity coordinate system by a series of rotations.

As shown in FIG. 3, this new Neutral, Green-chromaticity, Illuminant-chromaticity (N, GC, I) coordinate system can be generated from the Red, Green, Blue coordinate system by means of two successive rotations about coordinate axes, these coordinate rotations are not to be confused with the color "rotations" discussed above. Since the R, G, B coordinate system shown in FIG. 1 is right handed, the first rotation is a negative rotation of 45° about the Green axis producing two new axes R' and B'. B' now corresponds to what is commonly referred to as the Illuminant-chromaticity axis in a chromaticity plane passing through the origin of the R, G, B coordinate system. A second negative rotation of 54° 44' about this Illuminant-chromaticity axis will shift the axis G to produce a first axis G' that is equidistant from the original R, G, and B axes and which therefore corresponds to the Neutral axis. The second rotation also produces a second axis R" which corresponds to the negative extension of a Green-chromaticity axis GC. The Illuminant-chromaticity axis and the Green-chromaticity axis define a plane perpendicular to the Neutral axis. This coordinate transformation can be expressed in the form of a coordinate transformation matrix [W].

The printing densities from equation (1) in this new N, GC, I coordinate system may be defined as:

$$[D'] = [W][D] \quad (13)$$

where:
- [D']—is a 3×1 column vector having elements $d_i'$ representing the Printing Densities in the N, GC, I coordinate system;
- [D]—is a 3×1 column vector having elements $d_i$ representing the Printing Densities in the R, G, B coordinate system; and
- [W]—is a 3×3 matrix of elements $w_{ij}$ representing the coordinate transformation from R, G, B to N, GC, I Equation (13) can be written in a form representing changes in printing density:

$$[\Delta D'] = [W][\Delta D] \quad (14)$$

Similarly, the source exposures in the new coordinate system can be written as:

$$[\log E'] = [W][\log E] \quad (15)$$

and likewise changes in the source exposures relate as:

$$[\Delta \log E'] = [W][\Delta \log E] \quad (16)$$

solving equation (15) for [log E]:

$$[\log E] = [W]^{-1}[\log E'] \quad (17)$$

If a correction matrix in the new coordinate system is designated as [B], the changes in source exposure relate to changes in printing density in the following way:

$$[\Delta \log E'] = [B][\Delta D'] \tag{18}$$

To solve for [B] in terms of [W] and [A], we substitute [A] [ΔD] for [Δlog E] in equation (16) so that:

$$[\Delta \log E'] = [W][A][\Delta D] \tag{19}$$

solving for [ΔD] in equation (14) we get:

$$[\Delta D] = [W]^{-1}[\Delta D'] \tag{20}$$

and substituting $[W]^{-1}[\Delta D']$ for [ΔD] in equation (19) we get:

$$[\Delta \log E'] = [W][A][W]^{-1}[\Delta D'] \tag{21}$$

comparing equation (18) to equation (21) it is seen that:

$$[B] = [W][A][W]^{-1} \tag{22}$$

and by similar argument, it can be shown that:

$$[A] = [W]^{-1}[B][W] \tag{23}$$

If [W] is orthogonal, $[W]^{-1} = [W]^T$ where $[W]^T$ is the transpose of [W] obtained by writing the rows as columns and the columns as rows.

In order to obtain an orthogonal transformation from the R, G, B coordinate system to the N, GC, I coordinate system, the elements $w_{ij}$ of matrix [W] may be chosen as:

$$[W] = \begin{bmatrix} \frac{1}{\sqrt{3}} & \frac{1}{\sqrt{3}} & \frac{1}{\sqrt{3}} \\ \frac{-1}{\sqrt{6}} & \frac{2}{\sqrt{6}} & \frac{-1}{\sqrt{6}} \\ \frac{-1}{\sqrt{2}} & 0 & \frac{1}{\sqrt{2}} \end{bmatrix} \tag{24}$$

and $[W]^T$ becomes:

$$[W]^T = \begin{bmatrix} \frac{1}{\sqrt{3}} & \frac{-1}{\sqrt{6}} & \frac{-1}{\sqrt{2}} \\ \frac{1}{\sqrt{3}} & \frac{2}{\sqrt{6}} & 0 \\ \frac{1}{\sqrt{3}} & \frac{-1}{\sqrt{6}} & \frac{1}{\sqrt{2}} \end{bmatrix}$$

It will be noted that the matrix elements $w_{ij}$ are the cosines of the angles between the R, G, B coordinates and the corresponding Neutral, Green-chromaticity, Illuminant-chromaticity coordinates.

In the new coordinate system, the diagonal elements $b_{ij}$ of the correction matrix [B] correspond exactly with the traditionally defined and intuitively comprehensible correction levels along the N, GC, and I axes; thus:

$b_{11}$—is identical to the neutral correction level NC computed in equation (8) above;

$b_{22}$—is the Green-chromaticity correction level computed from matrix elements $a_{ij}$ by means of equation (9) above; and $b_{33}$—is the Illuminant-chromaticity correction level which was most often derived from test patches in the prior art.

Figure 4:
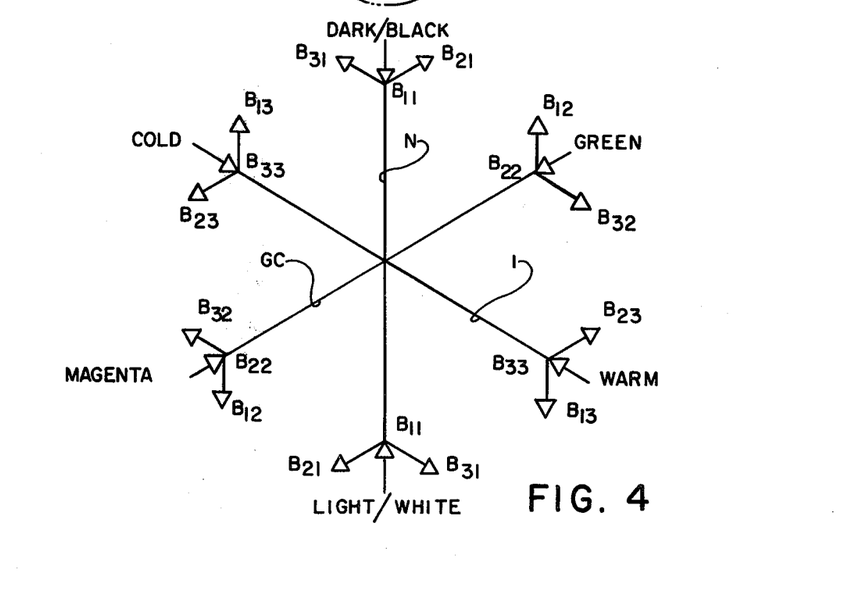
FIG. 4 is a diagram showing the effect of changing, in a positive sense, each of the matrix elements of the correction matrix expressed in the Neutral, Green-chromaticity, Illuminant-chromaticity coordinate system.

The remaining off-diagonal terms can best be described by referring to FIG. 4 where a three-dimensional vector space having axes labeled N, GC, and I, is represented. The vectors $B_{ij}$, along the axes show the effect of increasing (in a positive sense) each of the elements $b_{ij}$ of the matrix. For instance, greens become more neutral (or magenta) along the vector $B_{22}$ if matrix element $b_{22}$ is made more positive. In addition, the two rotational effect vectors $B_{12}$ and $B_{32}$ show the neutral rotation for green-magenta scenes and illuminant rotation for green-magenta scenes respectively. Green scenes, for example, can be made to print heavier by increasing $b_{12}$ and warmer by increasing $b_{32}$. Each of these latter two elements, $b_{12}$ and $b_{32}$ has the opposite effect on magenta scenes as is shown by the vectors in FIG. 4. In summary, the effect of adjusting each of the coefficients $b_{ij}$ in a positive sense can be tabulated as in Table 1:

Table 1

| | | | | | |
|---|---|---|---|---|---|
| $b_{11}$ | Neutral Correction whites darker blacks lighter | $b_{12}$ | N/GC rotation greens darker magentas lighter | $b_{13}$ | N/I rotation cold scenes darker warm scenes lighter |
| $b_{21}$ | GC/N rotation whites more magenta blacks greener | $b_{22}$ | GC Correction greens more magenta magentas greener | $b_{23}$ | GC/I rotation cold scenes more magenta warm scenes greener |
| $b_{31}$ | I/N rotation whites warmer blacks colder | $b_{32}$ | I/GC rotation greens warmer magentas colder | $b_{33}$ | I Correction cold scenes warmer warm scenes colder |

Thus in order to modify any particular correction of a settable matrix printer, requires that correction matrix [A] be transformed to the [B] form, the particular elements $b_{ij}$ be modified as required, and the modified matrix [B] be transformed back into the R, G, B coordinate system to yield the new correction matrix [A].

For example, a photofinisher may find that he is receiving a higher than usual number of originals that were improperly exposed, resulting in a larger than normal neutral density spread in his population of originals. In this case, the photofinisher may wish to increase the Neutral Correction Level of his settable matrix printer. In order to implement such a change, after transforming the printer correction matrix from the [A] form to the [B] form, the photofinisher would increase the value of element $b_{11}$ of the transformed matrix to the desired new Neutral Correction Level. To cancel any color rotations that may have been introduced by changing the Neutral Correction Level, elements $b_{21}$ and $b_{31}$ would also be increased by a proportional amount. The new [B] matrix would then be inversely transformed to yield a new [A] matrix for the settable matrix printer.

Similarly, if a photofinisher is located in an area where customers' film is ordinarily subjected to high heat and humidity such as may occur in a tropical climate, or is routinely kept for long periods of time and sent in for finishing after the expiration data of the film, unwanted color shifts along the Green-chromaticity axis may occur and the photofinisher may wish to increase the Green-chromaticity Correction Level of his settable matrix color printer without affecting the Illuminant-chromaticity Correction Level or the Neutral Correction Level. The Green-chromaticity Correction Level is increased by increasing the value of element $b_{22}$ of the transformed correction matrix. Any color rotation that may have been induced by this change is removed by increasing the value of element $b_{32}$ by a proportional amount. Although the neutral rotation that is introduced by changing a chromatic correction level is not ordinarily observable in the resulting prints, the neutral rotation may be removed by changing the value of element $b_{12}$ in proportion to the amount by which element $b_{22}$ was changed.

Likewise, a photofinisher whose population of originals exhibit more or less than the usual amount of illuminant failure may want to increase or decrease the Illuminant-chromaticity Correction Level of his settable matrix printer. This adjustment is accomplished by changing the value of element $b_{33}$ in the desired direction. The color rotation thus induced is removed by changing element $b_{23}$ a proportional amount in the same direction. The neutral rotation may be removed as before by similarly changing the value of element $b_{13}$ by the same proportions.

Of course, it will be understood that any two or all three of the Neutral, Green-chromaticity, and/or Illuminant-chromaticity Correction Levels may be changed at the same time by observing the procedure outlined above. Especially all chromaticity correction levels may be changed by the same amount of changing $b_{22}$ and $b_{33}$ by the same proportion at the same time.

It should be noted that this method provides a direct, quantitative control of the Neutral, Green-chromaticity, and Illuminant-chromaticity correction levels and associated color rotations. A means for direct manipulation of the Red and Blue chromaticity correction levels is not provided, however manipulation of these correction levels can still be accomplished using the prior art methods.

In an unmodified settable matrix printer of the type disclosed in U.S. Pat. No. 3,120,782, the above disclosed method of adjusting correction levels would be accomplished by noting the settings of the variable matrix elements of matrix [A], mathematically transforming the matrix [A] to the [B] form according to equation (22), effecting the desired changes in the matrix elements $b_{ij}$, mathematically transforming the new [B] matrix back to the [A] form according to equation (23), noting the new values $a_{ij}$ of the new matrix [A], and implementing the changes by setting the variable matrix elements in the printer to correspond to the values of the newly calculated matrix elements. Of course, the above calculations can be accomplished by a programmed digital computer, and in the case where the exposure control computation portion of the settable matrix printer comprises a digital computer, the exposure control computer may be programmed to accomplish the matrix transformation, to output the [B] matrix on a suitable display device such as a teletypewriter, to accept the desired changes via a suitable input device, to perform the inverse transformation to yield the new [A] matrix, and to substitute the new values for matrix elements $a_{ij}$ in the printer correction matrix.

Figure 5:
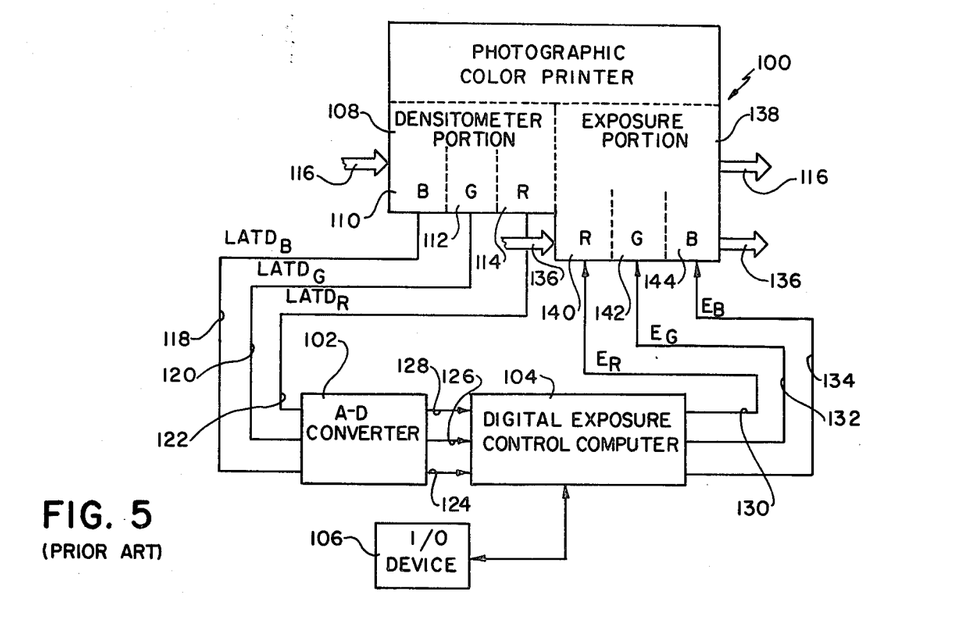
FIG. 5 is a schematic diagram of a prior art, variable-matrix, digital computer-controlled, photographic printer suitable for use with the present invention.

The implementation of such a program will now be described with references to FIGS. 5, 6, and 7. FIG. 5 illustrates schematically a digital computer-controlled photographic color printer of the type known in the prior art. The photographic printing apparatus shown schematically in FIG. 5 includes a photographic color printer, generally designated 100, for processing originals such as photographic negatives and exposing photographic prints therefrom, an analog-to-digital converter 102 for converting analog signals to digital signals, a digital exposure control computer 104, and an input/output device 106 such as a teletypewriter connected to the digital computer. The printer 100 includes a densitometer portion 108 having Blue, Green, and Red channels 110, 112, and 114 for measuring the Blue, Green, and Red LATD's of originals 116 and producing analog output signals $LATD_{B, G, R}$ representative of the respective LATD's on lines 118, 120, and 122. The analog output signals $LATD_{B, G, R}$ are supplied via lines 118, 120, and 122 to the inputs of A–D converter 102. The A–D converter is responsive to the analog signals to produce digital signals representing the respective LATD's. The digital LATD signals are supplied via lines 124, 126, and 128 to digital exposure-control computer 104.

Figures 6, 7:
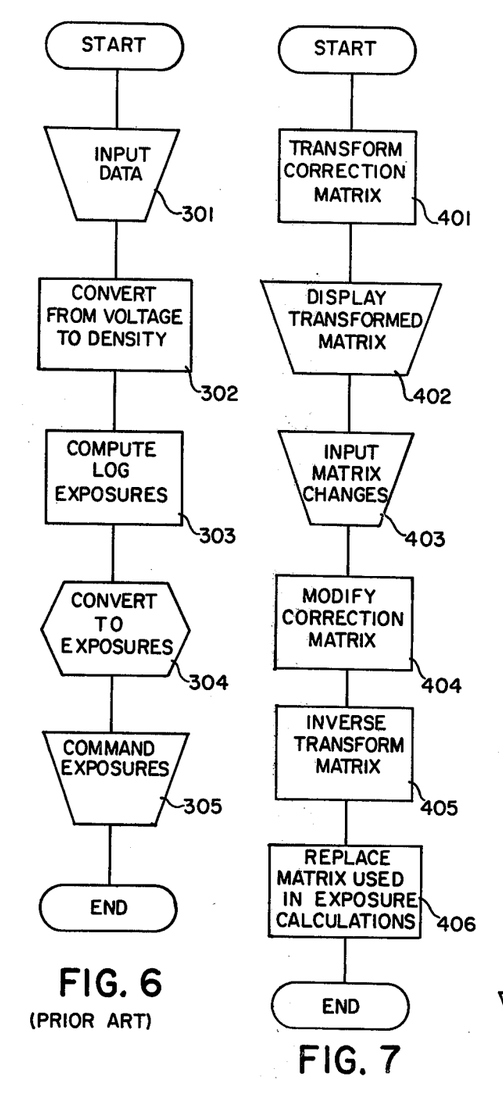
FIG. 6 is a flow chart illustrating the prior art program for calculating exposures for the digtal computer of FIG. 5.
FIG. 7 is a flow chart illustrating how the digital computer associated with the photographic color printer of FIG. 5 may be programmed to enable the operator to effect changes to the correction matrix according to the present invention.

The digital exposure-control computer 104 is programmed according to the flow chart shown in FIG. 6 to execute the following operations. The computer 104 receives the digital LATD data via lines 124, 126, and 128 (Block 301 in FIG. 6). The LATD values are converted to printing densities according to equation (1) (Block 302 in FIG. 6). The printing densities are then used to compute log exposures according to equation (2). (Block 303 in FIG. 6). The log exposures are next converted to exposures by means of a subroutine (Block 304 in FIG. 6) according to the equation:

$$E_i = 10^{\log E_i} \tag{26}$$

where—$i = R, G, B$
$E_i$—are the exposures; and
log $E_i$—are the log exposures.

The computer then issues the exposure commands $E_i$ (Block 305 in FIG. 6) on output lines 130, 132, and 134 as shown in FIG. 5.

The printer 100, further includes an exposure portion 138 having Red, Green, and Blue channels 140, 142 and 144 responsive to the red, green, and blue exposure signals $E_{R, G, B}$ produced by the digital exposure-control computer for controlling the exposure of the originals 116 onto a photosensitive medium such as photographic paper 136.

The photographic color printer shown schematically in FIG. 5 may take any one of several forms which are well known in the art. For example, the densitometer portion may be physically located away from the paper exposure portion of the printer, in which case the LATD's measured from a given original (in a group of originals) in the densitometer portion of the printer would be stored in a memory associated with the computer until the corresponding original reached the exposure portion of the printer. In another form, the densitometer portion and exposure portion of the printer may be physically located together so that an original is measured and printed without moving from its station within the printer.

The exposure portion of the printer may also take various forms which are well known in the art. For example, the exposure can be controlled by varying either the time or intensity of the exposing light, or some combination of the two. In addition, the exposing light source can be either additive (i.e., separate sources of primary colors of light) or subtractive (i.e., a white light source with primary color exposures terminated by filters of complementary color).

According to one embodiment of the present invention, the digital computer 104 illustrated in FIG. 5 includes a program as outlined in the flowchart shown in FIG. 7. When the program is executed, the computer first transforms the correction matrix [A] expressed in the R, G, B coordinate system to the [B] form expressed in the N, GC, I coordinate system according to equation (22). (Block 401 of FIG. 7). The program then causes the correction matrix [B] to be displayed on the input/output device 106 shown in FIG. 5 (Block 402 of FIG. 7). The operator can input the desired changes to the correction matrix [B], according to Table 1 via the input/output device (Block 403 of FIG. 7). The computer then modifies the correction matrix [B] according to the operator input (Block 404 of FIG. 7) and performs an inverse transformation on the correction matrix according to equation (23) to return the modified correction matrix to the R, G, B coordinate system (Block 405 of FIG. 7). Finally, the computer replaces the old [A] matrix in computer memory with the new [A] matrix for use in future exposure calculations (Block 406 of FIG. 7).

According to a preferred embodiment of the present invention, the correction matrix resides in the exposure control computer in the [B] form (i.e., in the N, GC, I coordinate system) so that it is not necessary to perform a coordinate transformation on the correction matrix each time the correction matrix is to be changed.

Figure 8:
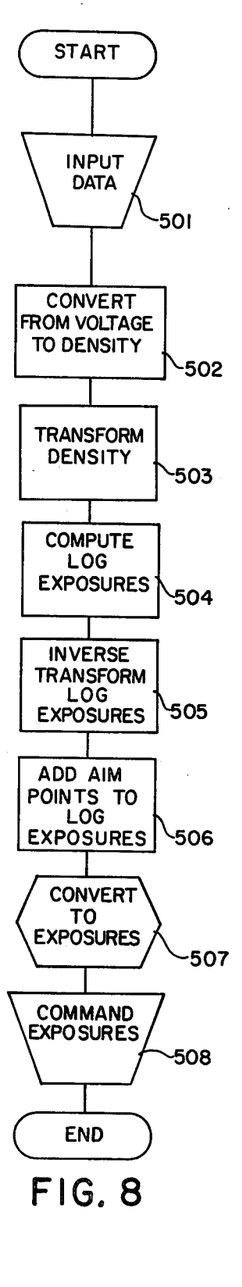
FIG. 8 is a flow chart illustrating an alternative exposure calculation program, according to the present invention, for the digital exposure-control computer associated with the color printer shown in FIG. 5.

A flowchart for programming the digital exposure control computer 106 of FIG. 5 to calculate exposures according to this preferred embodiment is shown in FIG. 8. Referring now to FIG. 8, the computer receives the digital LATD information from the A–D converter (Block 501) and converts the LATD data to printing densities according to equation (1) (Block 502). The density data is next transformed from the R, G, B coordinate system to the N, GC, I coordinate system according to equation (13) (Block 503). The density data expressed in the N, GC, I coordinate system is used to compute log exposures [log E'] expressed in the N, GC, I coordinate system according to equation (18) (Block 504), and the log exposures are transformed back into the R, G, B coordinate system (Block 505) according to equation (17). Next, the aim points $k_i$ in the R, G, B coordinate system are added to the log exposures to complete the log exposure calculations (Block 506). The log exposures [log $E_i$] are converted to exposures according to equation (26) (Block 507) and signals representing the exposures are output via lines 130, 132 and 134 in FIG. 5.

Figure 9:
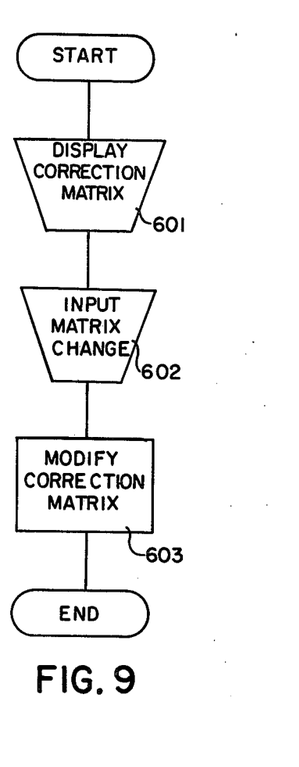
FIG. 9 is a flow chart illustrating the program for the digital exposure-control computer shown in FIG. 5 to be used with the exposure calculation program illustrated in FIG. 8 to enable the printer operator to effect changes to the correction matrix according to the present invention.

To enable the operator to adjust the correction matrix, a routine is programmed in the computer according to the flowchart shown in FIG. 9. When the routine is called, the printer displays the correction matrix [B] via the input-output device 106 (Block 601). The operator inputs the desired changes via the input/output device (Block 602) and the computer modifies the correction matrix accordingly (Block 603).

Thus according to the preferred embodiment of the present invention, the correction matrix always resides in the exposure control computer in the [B] form (i.e., in the N, GC, I coordinate system) and can be adjusted according to the rules of Table 1 without first having to perform the transformation.

Figure 10:
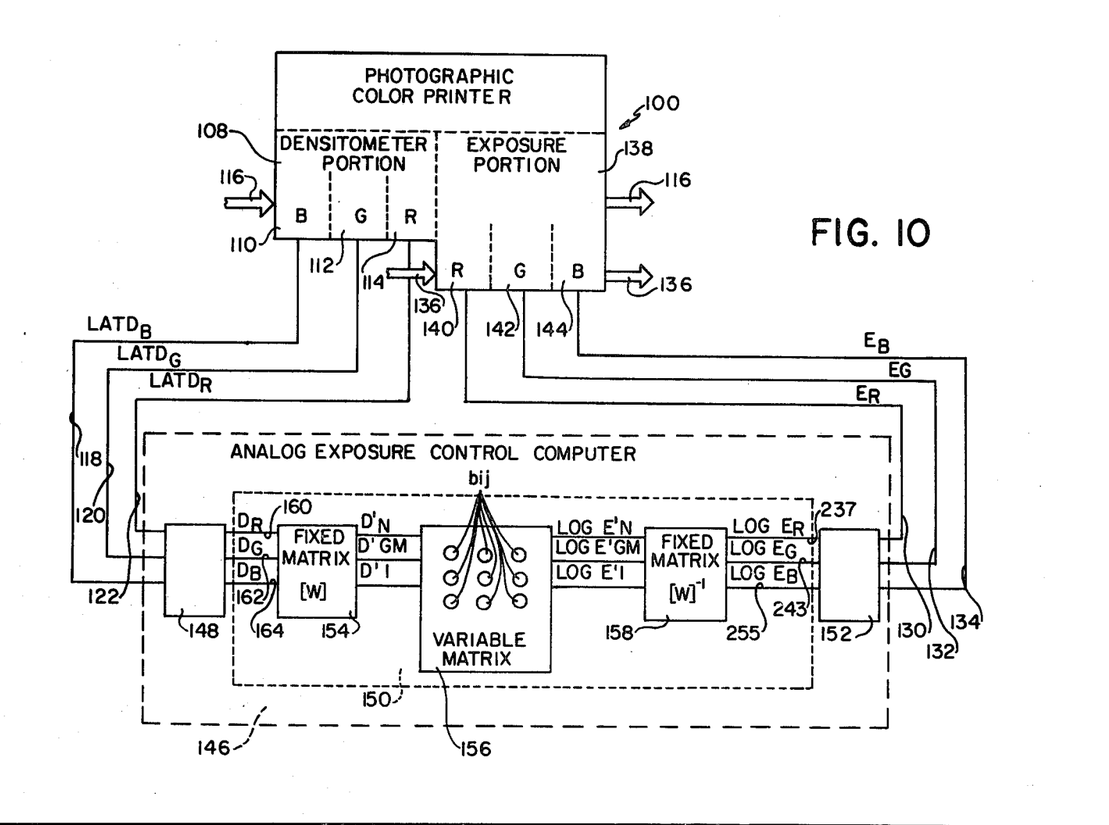
FIG. 10 is a schematic diagram of a variable matrix, analog computer-controlled, color photographic printer according to the present invention.

The preferred embodiment outlined above may also be incorporated in a settable matrix printer having an analog exposure control computer. Referring to FIG. 10, a schematic of such a photographic color printer is shown. The elements of the photographic color printer, generally designated 100, are similar to the elements of the color printer 100 of FIG. 5 and have been described previously; similar elements have been similarly numbered.

The signals generated by the densitometer portion 108 of the printer and representing the Blue, Green, and Red LATD's of the original being measured are supplied respectively via lines 118, 120, and 122 to an analog exposure control computer 146. The analog computer 146 includes a circuit 148 responsive to the LATD signals for producing signals representative of printing densities $D_{R, G, B}$ according to equation (1). Such circuits are well known in the art and will not be described in detail. The signals representing red, green, and blue printing densities produced by circuit 148 are fed to a log exposure computer 150 that is responsive to those signals for producing signals representing red, green, and blue log exposures according to equation (2), but prior to adding the aimpoint constants $k_i$. The red, green, and blue log exposure signals produced by computer 150 are applied to the inputs of a circuit 152 which is responsive to the log exposure signals for producing the final exposure signals that are used to control the exposure portion 138 of the color printer 100 via lines 130, 132 and 134. Circuit 152 includes means for adding the constants $k_i$ of equation (2) to the red, green, and blue log exposure signals supplied by log exposure computer 150 and means for converting the resulting log exposure signals to signals representing red, green, and blue exposures. Circuits for performing these functions are well known in the art and will not be described further.

Log exposure computer 150 includes a first fixed matrix 154 which is responsive to the signals representing the Red, Green, and Blue printing densities supplied by circuit 148 to its inputs for producing signals representative of Neutral, Green-chromaticity, and Illuminant-chromaticity printing densities at its output. The output of fixed matrix 154 is connected to the input of a variable matrix 156. Variable matrix 156 is responsive to the Neutral, Green-chromaticity, and Illuminant-chromaticity printing density signals for producing signals representing Neutral, Green-chromaticity, and Illuminant-chromaticity log exposures at its output. Variable matrix 156 corresponds to the correction matrix [B] expressed in the N, GC, I coordinate system. Adjustable elements labeled $b_{ij}$ control the value of corresponding matrix elements $b_{ij}$ of the printer correction matrix [B]. The input of a second fixed matrix 158 is connected to the output of variable matrix 156. Fixed matrix 158 is responsive to the signals representing Neutral, Green-chromaticity, and Illuminant-chromaticity log exposures for producing at its outputs, signals representing Red, Green, and Blue log exposures.

Figure 11:
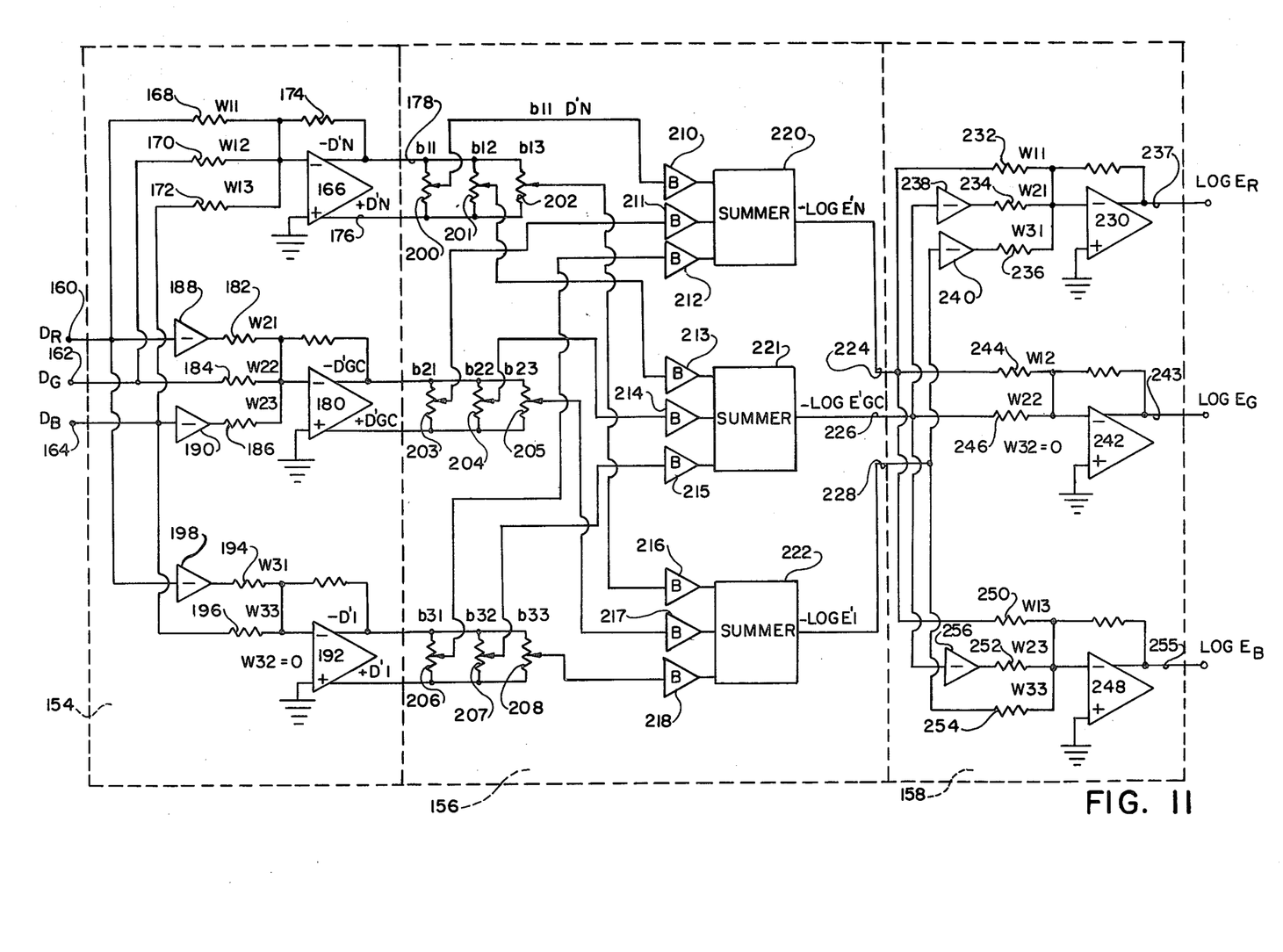
FIG. 11 is a schematic circuit diagram of the matrix exposure computation portion of the color printer of FIG. 10.

The log exposure computer 150 will now be described in greater detail with reference to FIG. 11.

The signals representing Red, Green, and Blue printing densities are applied to the first fixed matrix 154 on lines 160, 162, and 164 respectively. The fixed matrix 154 includes a first channel having an operational amplifier 166 to which the Red, Green, and Blue densities are supplied via matrix resistors 168, 170, and 172 to produce the Neutral printing density according to equation (13). The values of matrix resistors 168, 170, and 172 are selected in relation to the value of a feedback resistor 174 such that the ratio of the feedback resistor to the value of the matrix resistor equals the value of the corresponding matrix element of equation (24). For example, if the value of feedback resistor 174 is 1000 ohms, the values of resistors 168, 170, and 172 would all be 1,732 ohms (i.e., $\sqrt{3} \times 1000$). Operational amplifier 166 has a normal output 176 and an inverted output 178 upon which are impressed signals corresponding to $+D_N'$ and $-D_N'$ respectively.

Similarly, the first fixed matrix 154 includes a second channel having an operational amplifier 180 to which the Red, Green, and Blue printing densities are supplied via matrix resistors 182, 184, and 186 to produce normal and inverted Green-chromaticity printing density signals ($\pm D_{GC}'$) according to equation (13). The signals applied through matrix resistors 182 and 186 are first inverted by inverting amplifiers 188 and 190 since the signs of the values for the corresponding matrix elements $w_{21}$ and $w_{23}$ of the transformation matrix [W] are negative.

A third channel includes operational amplifier 192 to which the signals representing the Red and Blue printing densities are supplied via matrix resistors 194 and 196 respectively to produce signals representing the normal and inverted Illuminant-chromaticity densities ($\pm D_I'$) according to equation (13). The Red printing density signal is inverted by inverting amplifier 198 prior to supplying it to resistor 194 since the corresponding matrix element $w_{31}$ is negative. No Blue printing density signal is supplied to amplifier 192 since the corresponding matrix element $w_{32}$ is zero.

The variable matrix section 156 of the log exposure computer includes nine potentiometers 200–208, nine buffer amplifiers 210–218, and three summing amplifiers 220, 221, and 222.

The normal and inverted output signals of operational amplifiers 166, 180, and 192 are applied across potentiometers 200–208 in parallel groups of three. The adjustable tap of each potentiometer then senses a proportional part, either positive or negative depending upon the adjustment of the potentiometer, of the signals representing printing density expressed in the N, GC, I coordinate system. Each signal from the adjustable tap of each potentiometer is buffered by a buffer amplifier to isolate the impedence of the potentiometers from the impedence of the summing resistors in the summing amplifiers. The buffered signals are then fed to the summing amplifiers in groups of three, one signal to each amplifier from each channel of fixed matrix 154.

The summing amplifiers combine the appropriate terms to supply signals representing Neutral, Green-chromaticity, and Illuminant-chromaticity log exposures on lines 224, 226, and 228 respectively according to equation (18).

The second fixed matrix portion 158 of the log exposure computer includes a first channel having an operational amplifier 230 to which the Neutral, Green-chromaticity, Illuminant-chromaticity log exposure signals are applied via lines 224, 226, and 228 through matrix resistors 232, 234, and 236 to produce a signal on line 237 representing the Red log exposure according to equation (17). The inputs of matrix resistors 234 and 236 have been inverted by inverting amplifiers 238 and 240 since the signs of the corresponding matrix elements $w_{21}$ and $w_{31}$ are negative.

Similarly, a second channel including operational amplifier 242 produces a signal corresponding to the Green log exposure on line 243 in response to receiving the signals representing Neutral and Green-chromaticity log exposures via matrix resistors 244, and 246. No signal representing Illuminant-chromaticity log exposure is applied to this second channel since the corresponding matrix element is zero.

Finally, a third channel including operational amplifier 248 is responsive to Neutral, Green-chromaticity, and Illuminant-chromaticity log exposure signals supplied via matrix resistors 250, 252, and 254 respectively to produce a signal representing Blue log exposure on line 255. The input to matrix resistor 252 has been inverted by an inverting amplifier 256 since the corresponding matrix element $w_{23}$ is negative.

The operator may adjust the Neutral, Green-chromaticity, and Illuminant-chromaticity correction levels and associated color rotations of the printer directly by adjusting the potentiometers 200–208.

Although the invention has been described with particular reference to preferred embodiments thereof, it will be readily understood that variations and modifications can be effected within the spirit and scope of the invention as described above and as defined in the following claims.

I claim:

1. A linear matrix exposure calculator, comprising:
   first fixed linear matrix means responsive to a plurality of signals representing measurements of the color components of an original expressed in a first coordinate system for producing signals representing color components of the original expressed in a second coordinate system;
   variable linear matrix means responsive to said signals representing color components expressed in said second coordinate system for producing signals representing a function of exposure expressed in said second coordinate system; and
   second fixed linear matrix means responsive to said signals representing a function of exposure expressed in said second coordinate system for producing signals representing a function of exposure expressed in said first coordinate systems.

2. The invention of claim 1 wherein: said first coordinate system is an orthogonal, three-dimensional, coordinate system having axes representing red, green, and blue; and said second coordinate system is an orthogonal three-dimensional coordinate system having an axis defined as red=green=blue.

3. The invention of claim 1 wherein: said first coordinate system is an orthogonal, three-dimensional, coordinate system having axes representing red, green, and blue, and said second coordinate system is generated from said first coordinate system by rotating said first coordinate system substantially 45° in a negative sense around the green axis to produce a first new axis substantially midway between the minus-red and blue axes and a second new axis perpendicular to said first new axis, and rotating the resulting coordinate system in a negative sense about said first new axis substantially 54°44′, to produce a third new axis substantially equidistant from said red, green, and blue axes, and a fourth new axis substantially perpendicular to said third new axis and said first new axis, said second coordinate system having axes, corresponding to said third new axis, the negative extension of said fourth new axis, and said first new axis.

4. A settable linear matrix exposure control computer for use in color copying apparatus, comprising:

a. means for transforming an N dimensional vector [D], where N is an integer greater than 1, representing measurements of the color components of an original, said color components being expressed in a first coordinate system, to an N dimensional vector [D'] representing color components of the original expressed in a second coordinate system according to a coordinate transformation of the general form:

$$[D'] = [W][D]$$

where [W] is a fixed N×N coordinate transformation matrix;

b. means for computing log exposures expressed in said second coordinate system according to a linear matrix formula of the general form:

$$[\log E'] = [B][D']$$

where
[log E']—is an N dimensional vector representing log exposures, and [B]—is an N×N linear matrix of elements whose values are adjustable;

c. means for inversely transforming the vector [log E'] from said second coordinate system to said first coordinate system according to a coordinate transformation of the general form:

$$[\log E] = [W]^{-1}[\log E']$$

where $[W]^{-1}$ is the inverse of the coordinate transformation matrix [W]; and d. means for adjusting the values of the elements of matrix [B].

5. A linear matrix exposure calculator for use in color copying apparatus, comprising:

a. first linear matrix means responsive to signals representing the red, green, and blue color components of an original for producing signals representative of neutral, green-chromaticity, and illuminant-chromaticity components of the original;

b. variable linear matrix means responsive to said signals representing neutral, green-chromaticity, and illuminant-chromaticity components of said original for producing signals representing neutral, green-chromaticity, and illuminant-chromaticity log exposures; and c. second linear matrix means responsive to said signals representing neutral, green-chromaticity, and illuminant-chromaticity log exposures for producing signals representing red, green and blue log exposures.

6. The invention of claim 5 wherein said first linear matrix means performs according to the general equation $$[D'] = [W][D]$$

where
[D']—is a 3×1 vector having elements $d_i'$ representing the neutral, green-chromaticity, and illuminant-chromaticity printing densities of the original
[W]—is the 3×3 matrix $$[W] = \begin{bmatrix} \frac{1}{\sqrt{3}} & \frac{1}{\sqrt{3}} & \frac{1}{\sqrt{3}} \\ \frac{-1}{\sqrt{6}} & \frac{2}{\sqrt{6}} & \frac{-1}{\sqrt{6}} \\ \frac{-1}{\sqrt{2}} & 0 & \frac{1}{\sqrt{2}} \end{bmatrix}$$

[D]—is a 3×1 vector having elements $d_i$ representing the red, green, and blue printing densities of the original; and wherein said second linear matrix means performs according to the general equation:

$$[\log E] = [W]^{-1}[\log E']$$

where
[log E']—is a 3×1 vector having elements log $E_i'$ representing neutral, green-chromaticity, and illuminant-chromaticity log exposures
$[W]^{-1}$—is the inverse of matrix [W], $$[W]^{-1} = \begin{bmatrix} \frac{1}{\sqrt{3}} & \frac{-1}{\sqrt{6}} & \frac{-1}{\sqrt{2}} \\ \frac{1}{\sqrt{3}} & \frac{2}{\sqrt{6}} & 0 \\ \frac{1}{\sqrt{3}} & \frac{-1}{\sqrt{6}} & \frac{1}{\sqrt{2}} \end{bmatrix}$$

[log E]—is a 3×1 vector having elements log $E_i$ representing red, green, and blue exposures.

7. In apparatus for producing color copies of an original, such apparatus including a color densitometer portion for measuring the original and producing signals representative of the red, green, and blue color components of the original and an exposure portion responsive to signals representing red, green, and blue exposures for exposing a photosensitive copy medium to controlled amounts of red, green, and blue light, and settable linear matrix exposure calculator, comprising:

a. first means responsive to the signals representing red, green, and blue color components of the original for producing signals representing neutral, green-chromaticity, and illuminant-chromaticity components of the original;

b. second means responsive to the signals representing neutral, green-chromaticity and illuminant-chromaticity components of the original for producing signals representing neutral, green-chromaticity, and illuminant-chromaticity log exposures, said second means including a settable linear matrix;

c. third means responsive to said signals representing neutral, green-chromaticity, and illuminant-chromaticity log exposures for producing signals representing red, green, and blue log exposures; and d. means for setting the values of the elements of said settable linear matrix.

8. An improved settable matrix color printer including a color measurement portion for producing signals representative of the color components of an original, an exposure portion for exposing a photosensitive medium to components of colored light in response to exposure signals, and an exposure control computer for generating the signals to control the exposure portion from the signals representative of the color components of the original according to the following general formula for exposure calculation;

$$[\log E] = [K] + [A][D]$$

where
- [log E]—is a 3×1 column vector having elements log $E_i$ representing log exposures expressed in a first coordinate system,
- [K]—is a 3×1 column vector having elements $k_i$ representing the aim points of the printer,
- [A]—is a 3×3 matrix of settable elements $a_{ij}$ representing the relationship between the signals representing color components of the original and the signals representing log exposures, and
- [D]—is a 3×1 column vector having elements $d_i$ representing the color components of the original expressed in the first coordinate system, wherein the improvement comprises:

a. means for transforming signals representing the matrix [A] in the first color coordinate system to signals representing the matrix [A] in a second color coordinate system, such transforming being in accordance with the general formula $$[B] = [W][A][W]^{-1}$$

where
- [B]—is a 3×3 matrix of elements $b_{ij}$ representing the matrix [A] expressed in the second color coordinate system,
- [W] ... [W]$^{-1}$ is a matrix transformation for transforming matrix [A] into matrix [B], b. means for adjusting the signals representing the values of the elements $b_{ij}$ of matrix [B];

c. means for inversely transforming the signals representing the adjusted matrix [B] to signals representing the adjusted matrix [B] in the first color coordinate system, such transforming being in accordance with the general formula $$[A]_{new} = [W]^{-1}[B][W]$$

where
- [A]$_{new}$ is a new correction matrix representing the adjusted matrix [B] in the first color coordinate system and [W]$^{-1}$ ... [W] is the inverse matrix transformation; and d. means using the signals representing the new matrix [A]$_{new}$ for setting the values of the elements of matrix [A] in the exposure calculation to the values of the elements of the matrix [A]$_{new}$.

9. The invention claimed in claim 8, wherein:
said first color coordinate system is an orthogonal three-dimensional coordinate system having axes corresponding to red, green, and blue; and
said second color coordinate system is an orthogonal three-dimension coordinate system having an axis relating to said first coordinate system such that red=green=blue.

10. An improved color printer for producing color copies from an original, the color printer including: a densitometer portion for measuring the original and producing signals representative of the red, green, and blue color components of the original, a variable linear matrix exposure control computer responsive to the signals produced by the densitometer portion for producing signals representing log exposures according to the matrix exposure control equation $$[\log E] = [K] + [A][D]$$

where
- [log E]—is a 3×1 column vector having elements log $E_i$ representing the red, green, and blue log exposures,
- [K]—is a 3×1 column vector having elements $K_i$ representing the aim points of the color printer,
- [A]—is a 3×3 matrix of settable elements $a_{ij}$ representing the relationships between the log exposures and the color components of the original, and
- [D]—is a 3×1 column vector representing the red, green, and blue color components of the original; and an exposure portion responsive to signals representing red, green, and blue exposures for exposing a photosensitive copy medium to corresponding amounts of red, green, and blue light, wherein the improvement comprises:

a. means for transforming first signals representing the values of elements comprising the matrix [A] from a red, green, blue coordinate system to second signals representing the values of elements comprising the matrix [A] transformed to a neutral, green-chromaticity, illuminant-chromaticity coordinate system;

b. means for modifying the second signals to provide third signals representing the values of the elements of a modified and transformed matrix [A];

c. means for inversely transforming the third signals to fourth signals representing the values of the elements of the modified and transformed matrix [A] in the red, green, blue coordinate system so as to define a new matrix, [A]$_{new}$, whose elements have values represented by the fourth signals; and d. means using the fourth signals for setting the values of the elements of matrix [A] in the exposure control computer to the values of the elements of the matrix [A]$_{new}$.

11. The invention claimed in claim 10 wherein said means for transforming the matrix [A] from the red, green, blue color coordinate system to the neutral, green-chromaticity, illuminant-chromaticity coordinate system, performs the transformation according to the general formula:

$$[B] = [W][A][W]^{-1}$$

where
[B] is the transformed matrix and [W]( ... )[W]$^{-1}$ is a matrix transformation where $$[W] = \begin{bmatrix} \frac{1}{\sqrt{3}} & \frac{1}{\sqrt{3}} & \frac{1}{\sqrt{3}} \\ \frac{-1}{\sqrt{6}} & \frac{2}{\sqrt{6}} & \frac{-1}{\sqrt{6}} \\ \frac{-1}{\sqrt{2}} & 0 & \frac{1}{\sqrt{2}} \end{bmatrix}$$

$$[W]^{-1} = \begin{bmatrix} \frac{1}{\sqrt{3}} & \frac{-1}{\sqrt{6}} & \frac{-1}{\sqrt{2}} \\ \frac{1}{\sqrt{3}} & \frac{2}{\sqrt{6}} & 0 \\ \frac{1}{\sqrt{3}} & \frac{-1}{\sqrt{6}} & \frac{1}{\sqrt{2}} \end{bmatrix}$$

and wherein said means for inversely transforming the matrix [B] performs the inverse transformation according to the general formula:

$$[A]_{new}=[W]^{-1}[B][W]$$

where

[A]$_{new}$—is the modified matrix [A].

12. A method of making color copies of an original by exposing the original onto a photosensitive medium, comprising the steps of:
 a. measuring the original to determine the color components of the original expressed in a first coordinate system;
 b. transforming the measurements obtained in step a. from said first coordinate system to a second coordinate system;
 c. calculating exposures expressed in said second coordinate system based on said measurements expressed in said second coordinate system according to a variable linear matrix formula of the general form:

$$[\text{Log } E']=[B][D']$$

where
 [Log E']—is a column vector having elements log $E_i'$ representing log exposures expressed in said second coordinate system,
 [B]—is a linear matrix of settable elements $b_{ij}$ representing the relationship between log exposures and color components of the original expressed in said second coordinate system, and
 [D']—is a column vector having elements $d_i'$ representing the color components of the original expressed in said second coordinate system;
 d. inversely transforming the log exposures calculated in step c. from said second coordinate system to said first coordinate system; and
 e. exposing the original onto the photosensitive medium as a function of the log exposures calculated in step d.

13. A settable linear matrix method of producing color copies of an original on a photosensitive copy medium, comprising the steps of:
 a. measuring the original to determine the red, green, and blue color components thereof;
 b. transforming the measurements obtained in step a. from a red, green, blue coordinate system to a neutral, green-chromaticity, illuminant-chromaticity coordinate system;
 c. calculating log exposures in the neutral, green-chromaticity, illuminant-chromaticity coordinate system by means of a settable linear matrix formula of the general form:

$$[\log E']=[B][D']$$

where
 [Log E']—is a 3×1 column vector having elements log $E_i'$ representing the log exposures expressed in the neutral, green-chromaticity, illuminant-chromaticity coordinate system;
 [B]—is a 3×3 linear matrix of settable matrix elements $b_{ij}$ representing the relationships between log exposures and measured color components of the original; and
 [D']—is a 3×1 column vector representing the measured color components of the original expressed in the neutral, green-chromaticity, illuminant-chromaticity coordinate systems;
 d. inversely transforming the log exposures calculated in step c. from the neutral, green-chromaticity, illuminant-chromaticity coordinate system to the red, green, blue coordinate system; and
 e. exposing the original onto the photosensitive copy medium as a function of the log exposures obtained in step d.

14. A method of adjusting correction levels defined along a first set of orthogonal axes in a settable matrix color printer of the type employing exposure calculations defined in terms of a second set of orthogonal axes, comprising the steps of:
 a. transforming first signals representing the values of matrix coefficient elements expressed in terms of the second coordinate system to second signals representing values of the matrix coefficient elements expressed in the first coordinate system;
 b. implementing desired changes to the values expressed in the first coordinate system by adjusting the second signals to desired values to form adjusted matrix coefficient elements that are expressed in terms of the first coordinate system;
 c. transforming the adjusted second signals obtained in step b. into third signals representing the values of adjusted matrix coefficient elements as expressed in the second coordinate system; and
 d. using the third signals for setting the matrix elements of the settable matrix in the color printer according to the values obtained in step c.

15. A method of adjusting the neutral, green-chromaticity, and illuminant-chromaticity correction levels and associated color rotations in a settable correction matrix color printer, comprising the steps of:
 a. transforming first signals representing the printer correction matrix in a red, green, blue coordinate system to second signals representing the matrix in a neutral, green-chromaticity, illuminant-chromaticity coordinate system so that the diagonal elements of the transformed matrix represent the neutral, green-chromaticity, and illuminant-chromaticity correction levels and the off-diagonal elements represent color rotations;
 b. modifying the second signals to form third signals that represent a modified correction matrix incorporating the desired changes in correction levels and color rotations as expressed in the neutral, green-chromaticity, illuminant-chromaticity coordinate system;
 c. transforming the third signals to fourth signals representing the modified correction matrix in the red, green, blue coordinate system to yield a new correction matrix; and
 d. using the fourth signals to modify the matrix elements of the settable correction matrix to conform to the values of the elements of the new correction matrix obtained in step c.

16. A method of adjusting the correction levels in a settable matrix printer comprising the steps of:
 a. transforming first signals representing the correction matrix of the settable matrix printer in a first coordinate system having axes that generally correspond to the measured parameters of an original from which prints are to be made to second signals representing the matrix in a second coordinate system having axes that generally correspond to the correction levels that are to be adjusted;

b. effecting desired changes to the transformed correction matrix by modifying the second signals to form third signals that represent desired modifications to the transformed correction matrix as expressed in the second coordinate system; and c. transforming the third signals to fourth signals that represent the modified and transformed correction matrix in the first coordinate system.

* * * * *